United States Patent [19]

Spokoiny et al.

[11] Patent Number: 5,164,085
[45] Date of Patent: Nov. 17, 1992

[54] WATER FILTER CARTRIDGE

[75] Inventors: Albert Spokoiny, Mercer Island, Wash.; R. David Webb, Onsted, Mich.

[73] Assignee: N.R.G. Enterprises, Inc., Mercer Island, Wash.

[21] Appl. No.: 803,547

[22] Filed: Dec. 9, 1991

[51] Int. Cl.⁵ .............................................. B01D 27/14
[52] U.S. Cl. .................................. 210/256; 210/315; 210/496; 210/497.01; 210/502.1; 210/506
[58] Field of Search ............... 210/679, 688, 256, 315, 210/497.01, 506, 259, 502.1, 510.1, 496

[56] References Cited

U.S. PATENT DOCUMENTS

| | | | |
|---|---|---|---|
| 4,218,317 | 8/1980 | Kirschmann | 210/117 |
| 4,368,123 | 1/1983 | Stanley | 210/269 |
| 4,540,489 | 9/1985 | Barnard | 210/315 |
| 4,804,467 | 2/1989 | Losos | 210/232 |
| 5,024,764 | 6/1991 | Holler | 210/497.01 |

OTHER PUBLICATIONS

Matrikx Extruded Carbon Filters 5 Brochure, KX Industries, LP 1990.

Primary Examiner—Ivars Cintins
Attorney, Agent, or Firm—Seed and Berry

[57] ABSTRACT

A filter cartridge for water purification consisting of several layers of filter material with successively smaller pore size. The outer layer is a prefiltration material with a pore size of approximately 10 microns, the central layer is an extruded carbon filter with a pore size of approximately 5 microns, and the inner layer is a ceramic filter with a pore size of approximately 0.9 microns. The extruded carbon layer of the filter is impregnated with a chemical agent to effect the removal of lead and other heavy metals, while the ceramic layer has been impregnated with silver to prevent bacterial buildup. The filter cartridge provides almost complete removal of chlorine, organic compounds, lead, heavy metals, particulate matter and microorganisms.

4 Claims, 1 Drawing Sheet

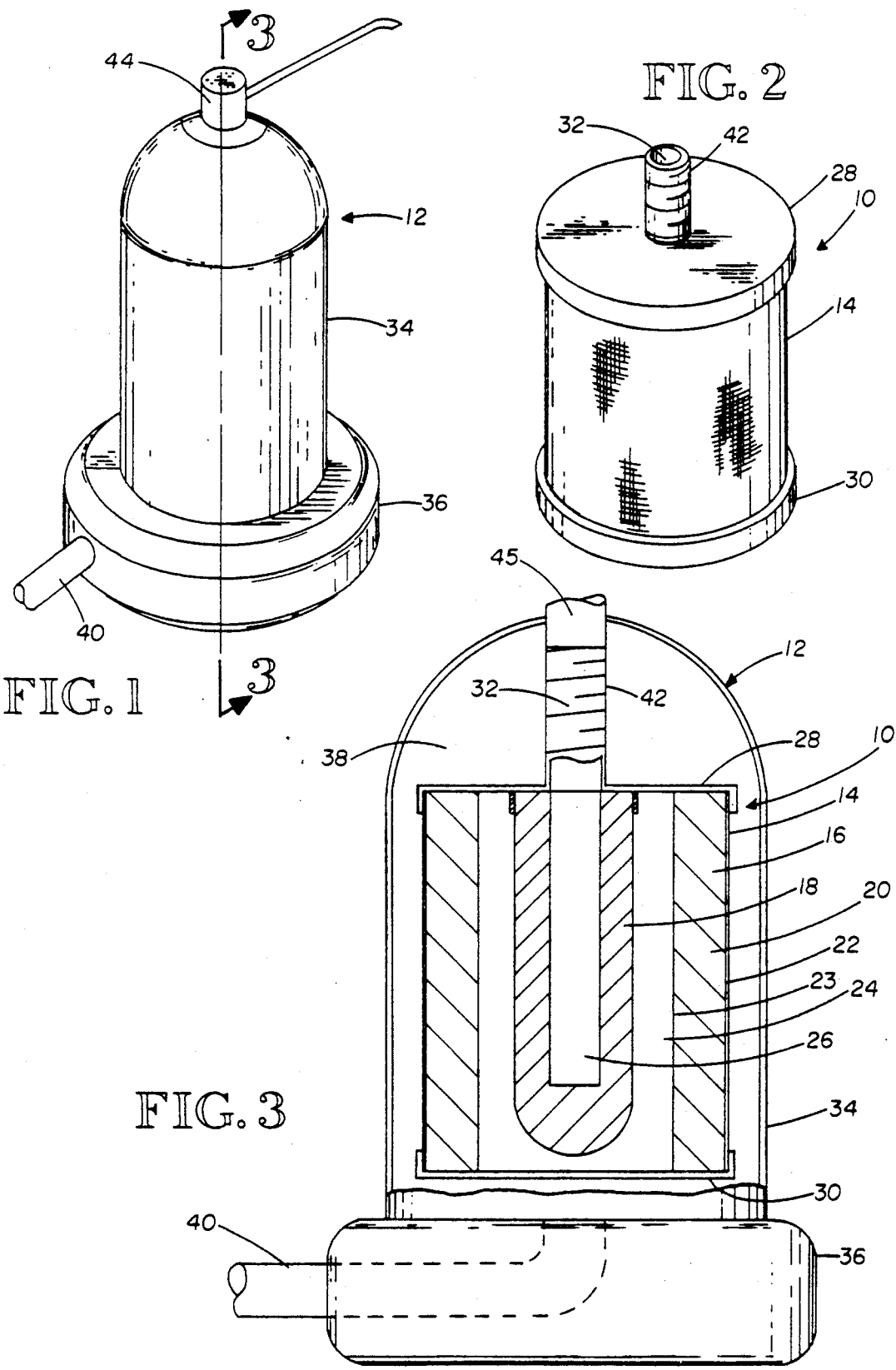

WATER FILTER CARTRIDGE

TECHNICAL FIELD

The present invention relates generally to water filter cartridges, and more particularly, to a water filter cartridge capable of removing virtually all chlorine, organic compounds, lead, other heavy metals, particulate matter, and microorganisms from the filtered water.

BACKGROUND OF THE INVENTION

Water filter cartridges commonly employ carbon as their main filtration agent. They will often surround the carbon filtration material with one or more layers of prefiltration material. Water filter cartridges sometimes use plastic end caps to provide structural integrity and to simplify the installation and removal of the filter cartridge.

While existing water filter cartridges may provide adequate water filtration for some applications, they are ineffective for the removal of lead and other heavy metals and pathogenic microorganisms such as *Giardia Lamblia, E. coli,* tyhoid, cholera, and cryptosporidium.

It will, therefore, be appreciated that there is a significant need for a water filter cartridge that is capable of removing lead and other heavy metals and pathogenic microorganisms. It is desirable that the water filter cartridge be relatively inexpensive and easy to install. The present invention fulfills these needs and further provides other related advantages.

SUMMARY OF THE INVENTION

The present invention resides in a water filter cartridge having an extruded carbon filter block with first and second ends and a central aperture and a ceramic filter positioned in the central aperture of the carbon block. The ceramic filter has an open end and a closed end, the closed end faces towards one end of the carbon filter block and the open end faces towards the other end of the carbon filter block. The filter is sealed at one end by a water impervious plastic cap that is glued to the carbon filter block with an FDA approved hot melt adhesive. The other end of the filter cartridge is also sealed by a water impervious plastic cap which is glued to the carbon filter block by a hot melt adhesive and also glued to the open end of the ceramic filter by a hot melt adhesive. The open end of the ceramic filter is in fluid communication with an orifice in the end cap to allow filtered water to flow out of the filter cartridge.

In the presently preferred embodiment of the invention, the extruded carbon filter block has layers of prefiltration material wrapped around the exterior, and is impregnated with a chemical agent to remove lead and other heavy metals, and the ceramic filter is impregnated with silver to prevent bacterial growth.

The filter cartridge is relatively easy and inexpensive to produce, and provides almost complete removal of chlorine, organic compounds, lead, other heavy metals, particulate matter, and microorganisms from the water.

Other features and advantages of the invention will become apparent from the following detailed description, taken in conjunction with the accompanying drawings.

BRIEF DESCRIPTION OF THE DRAWINGS

FIG. 1 is an isometric view of a water filter housing with which the water filter cartridge of the present invention is used.

FIG. 2 is an isometric view of a water filter cartridge embodying the present invention.

FIG. 3 is a side sectional view taken substantially along the line 3—3 of FIG. 1 showing the water filter cartridge of FIG. 2 within the water filter housing.

DETAILED DESCRIPTION OF THE INVENTION

As shown in the drawings for purposes of illustration, the present invention is embodied in a water filter cartridge, indicated generally by reference numeral 10. The filter cartridge 10 shown in FIG. 3 is housed in a conventional water filter housing 12 shown in FIG. 1. As best shown in FIG. 3, the filter cartridge consists of several stages of filtration beginning with an outer prefiltration layer 14, an activated extruded carbon block 16, and an inner ceramic filter 18. Each successive filter stage has a smaller pore size than the previous stage. The carbon block 16 has a cylindrical shape with a circumferentially extending sidewall 20 of a uniform thickness having an outer wall 22 and an inner wall 23. The inner wall of the carbon block 16 defines a central aperture 24 extending fully through the carbon block. The ceramic filter 18 is positioned within the central aperture of the carbon block and the outer prefiltration layer 14 is wrapped about the outer wall of the carbon block. The ceramic filter 18 has a cylindrical shape with a circumferentially extending sidewall of uniform thickness and a central cavity 26 which has an open top end and bottom end closed by a lower end wall. The filter cartridge has a top end cap 28 and a bottom end cap 30 that are made of a water impervious material such as plastic. Both end caps are sealed to the filter cartridge with an FDA approved hot melt adhesive. The end caps provide structural integrity and prevent water from entering the ends of the filter cartridge. Thus, water can only enter the filter cartridge by passing through the prefiltration layer 14 and the uniform thickness sidewall of the extruded carbon filter block 16. Water exits the filter cartridge through an orifice 32 in the top plastic end cap 28, which is in fluid communication with the central cavity 26 of the ceramic filter 18.

The filter cartridge 10 fits inside a housing 12. The housing 12 has a stainless steel cover 34 which is sealed to a base 36 to define an interior fluid-tight chamber 38 within which the filter cartridge 10 is positioned. The water to be filtered enters the interior chamber of the housing through a water inlet tube 40 extending through the base 36. The plastic end caps prevent water from entering the top or bottom of the filter cartridge. Thus, the water pressure forces the water to be filtered through the sides of the filter cartridge. The water first passes through the prefiltration layer 14.

The prefiltration layer 14 is preferably made from one or more layers of polypropylene, a conventional filter material, having a pore size of approximately ten microns. The prefiltration layer serves to remove large particles that would otherwise cause premature clogging of the carbon block 16.

The Water then enters the carbon filter block 16 through its outer wall. In the preferred embodiment, the filter block is made of extruded activated carbon, and has a pore size of approximately five microns. The activated carbon is extremely effective in the removal of chlorine, chloroform, and numerous other organic chemicals. The small pore size of the carbon filter serves to remove all but the smallest of contaminants from the water. In the preferred embodiment of the invention, a conventional lead oxidizing agent is blended into the extruded carbon filter. The oxidizing agent removes virtually all soluble and insoluble lead as well as other heavy metals from the water as it passes through the sidewall of the carbon block. Extruded carbon is preferred due to its greater uniformity of density, longer life and lower cost.

The water leaves the extruded carbon block 16 through its inner wall 23 and enters the central aperture 24 of the carbon filter block wherein the ceramic filter 18 is positioned. In the preferred embodiment, the ceramic filter has a pore size of 0.9 micron and has silver impregnated in the ceramic material during the manufacturing process. The very small pore size prevents most microorganisms from passage through the ceramic filter sidewall. Silver is well known as a bactericidal agent, and is added in the preferred embodiment to prevent the growth of bacteria on the ceramic filter itself. After the water passes through the ceramic filter sidewall, it enters the central cavity 26 of the ceramic filter and exits the open top end thereof. The open top end of the ceramic filter is in fluid communication with an orifice 32 in the top end cap 28. In the preferred embodiment, the orifice 32 is in fluid communication with a hollow tube 42 which projects upward from the top end cap 28 for mating with a brass fitting 45 that connects on the top of the housing 12 with a spigot 44 through which the filtered water exits the housing 12.

The extruded carbon filter block 16 and the ceramic filter 18 are both sealed to the interior side of the top end cap 28 with the hot melt adhesive to prevent fluid leakage. The sealed end caps prevent water from leaking around the filter cartridge. The carbon filter block 16 is also sealed to the interior side of the bottom end cap 30 with the hot melt adhesive to prevent fluid leakage. With this arrangement, the water is forced to exit the filter cartridge 10 through the orifice 32 in the top end cap 28 through the tube 42.

In operation, water enters the interior chamber of the housing 38 through the tube 40 in the base 36 and is forced to enter the filter cartridge through its sides. The water passes through the outer prefiltration layer 14, which can be one or more layers of filtration materials, and is forced through the uniform thickness sidewall of the extruded activated carbon block 16. The water then passes through the uniform thickness sidewall and lower end wall of the ceramic filter 18, and exits the filter cartridge 10 through the orifice 32 and tube 42 at the top of the filter cartridge. Thus, the water has been forced through several layers of filter material, each with a smaller pore size. In addition, the water has been exposed to the lead oxidizing agent in the carbon block 16 to remove any lead and other heavy metals in the water and to the silver impregnated in the ceramic filter 18 to kill any bacteria in the water that might lodge in the ceramic material.

It will be appreciated that, although specific embodiments of the invention have been described herein for purposes of illustration, the various modifications may be made without departing from the spirit or scope of the invention. Accordingly, the invention is not limited except by the appended claims.

We claim:

1. A water filter cartridge comprising an extruded carbon filter block having first and second ends and having a central aperture, said carbon filter block being impregnated with an agent to remove lead and other heavy metals;

a layer of prefiltration material positioned about the exterior of said carbon filter block;

a ceramic filter positioned in said central aperture of carbon filter block, said ceramic filter having a central cavity with an open end toward said carbon filter block first end and a closed end toward said carbon filter block second end, said ceramic filter being impregnated with silver;

a water impervious first end cap sealed to said carbon filter block first end, said ceramic filter open end also being sealed to said first end cap, said first end cap having an orifice in fluid communication with said ceramic filter central cavity; and a water impervious second end cap sealed to said carbon filter block second end, whereby water is filtered by flowing from exterior of said prefiltration material through to said ceramic filter central cavity and out of said orifice.

2. A water filter cartridge comprising:

an extruded carbon filter block having first and second closed ends and having a central cavity, said first closed end having a fluid passageway therethrough, said carbon filter block being impregnated with an agent to remove lead and other heavy metals; and a ceramic filter positioned in said carbon filter block central cavity, said ceramic filter having a central cavity with an open end toward said carbon filter block first end and a closed end toward said carbon filter block second end, said ceramic filter open end being in fluid communication with said carbon filter block fluid passageway, said ceramic filter being impregnated with silver, whereby water is filtered by flowing from exterior of said carbon filter block through to said ceramic filter central cavity.

3. The filter cartridge of claim 2 wherein said carbon filter block first and second ends are closed by a water impervious cap.

4. The filter cartridge of claim 2 wherein a layer of prefiltration material is positioned about the exterior of said carbon filter block.

* * * * *